United States Patent Office 2,708,852
Patented May 24, 1955

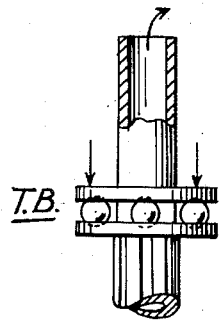
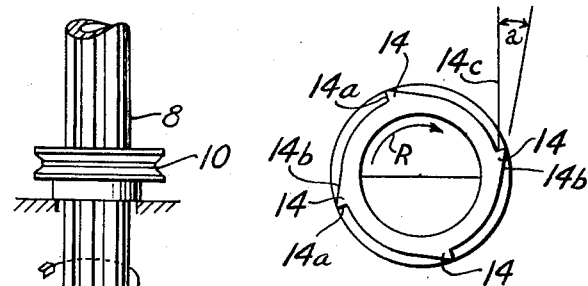
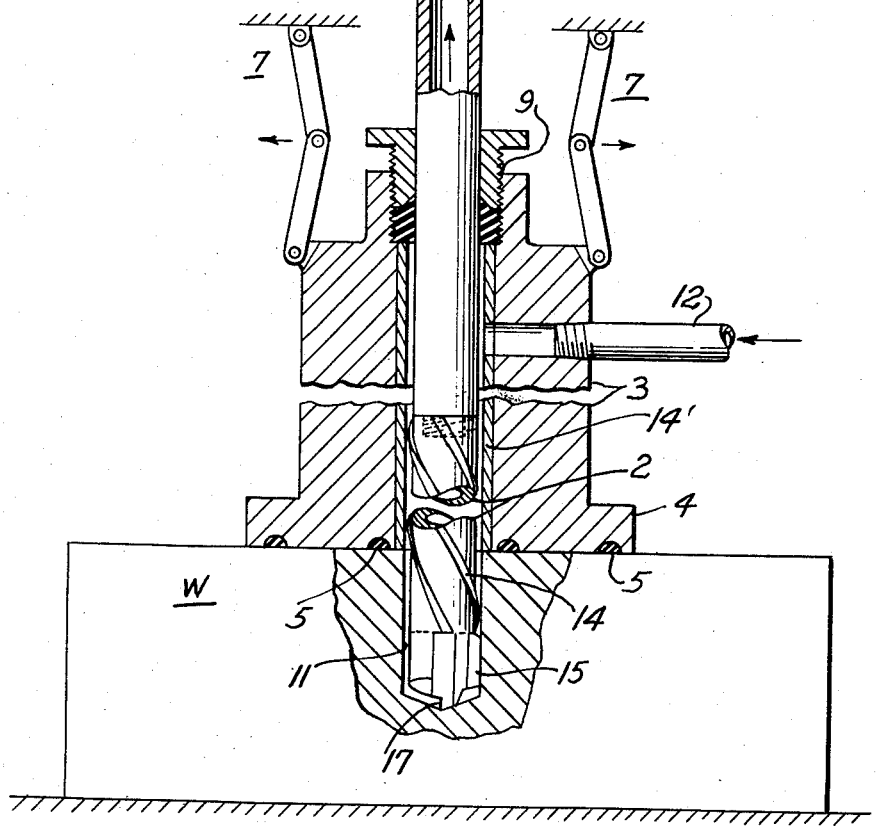

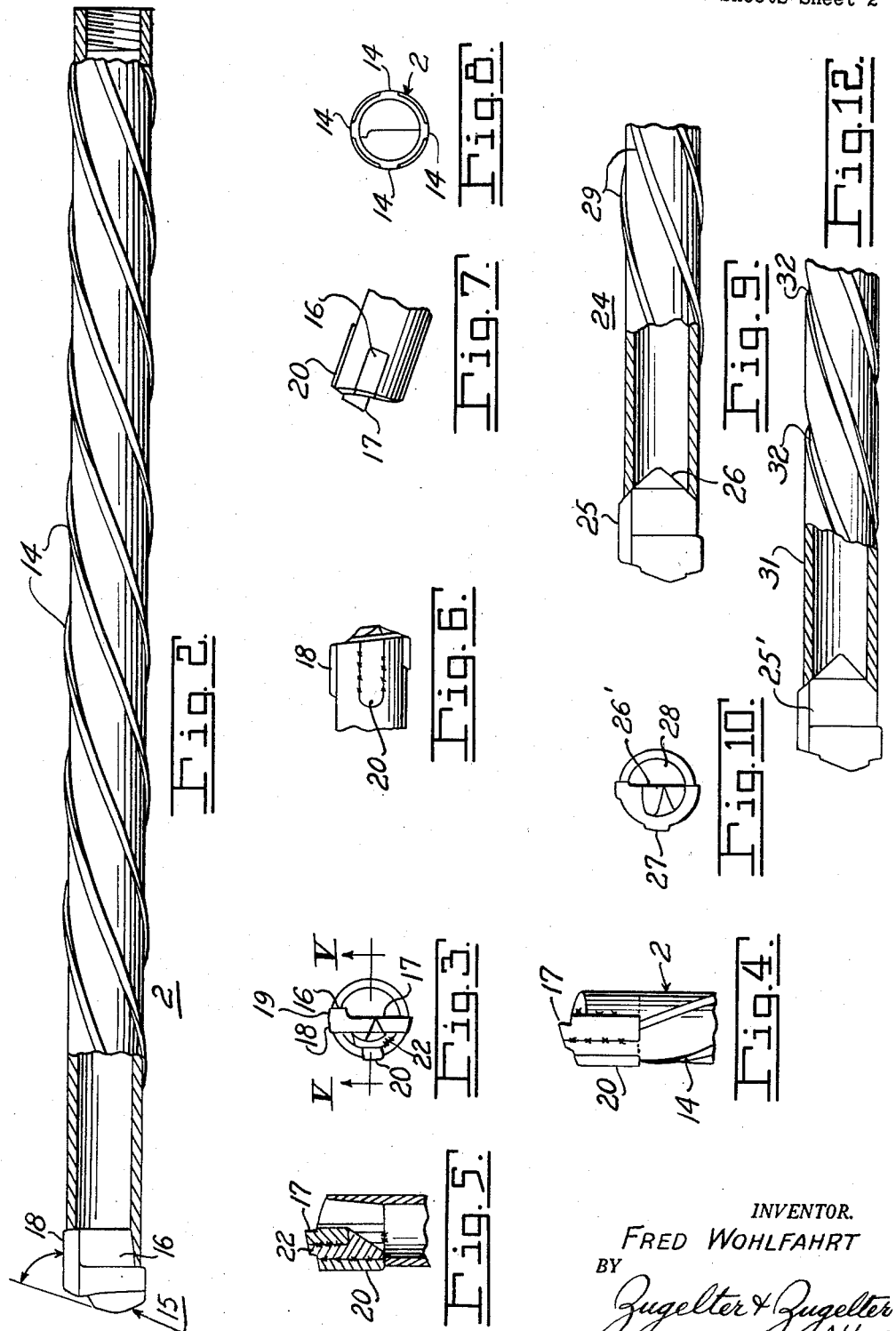
May 24, 1955 F. WOHLFAHRT 2,708,852
OIL CONDUIT DRILL
Filed Nov. 16, 1953 2 Sheets-Sheet 2
INVENTOR.
FRED WOHLFAHRT
BY
Zugelter & Zugelter
Attys.

2,708,852

OIL CONDUIT DRILL

Fred Wohlfahrt, Center Line, Mich.

Application November 16, 1953, Serial No. 392,206

2 Claims. (Cl. 77—68)

This invention relates to high-speed drills provided with means for feeding coolant to the cutting edges of the drill and thence into the hollow of the drill stem to remove cuttings with the coolant.

An object of this invention is to provide a drill having a hollow drill stem provided with a ported cutting tool, and with a spiral impeller on the outer wall of the stem for feeding coolant under pressure to the cutting tool of the drill stem, and thence through the port in the cutting tip into the interior of the stem, whereby the cuttings are removed, as formed, through the hollow of the stem to a point of disposal.

Another object of the invention is to provide a drill as above stated, in which the spiral impeller is formed by one or more ribs on the outer wall of the drill stem, which rib or ribs, when the drill stem is rotating through a guide bushing or housing supplied with coolant under pressure, boost the coolant pressure and stabilize the drill against vibration.

A still further object of the invention is to provide a drill of the type set forth above, in which the impeller is provided by one or more spiral grooves formed in the outer wall of the drill stem.

A still further object of the invention is to provide a drill as above set forth, having a solid carbide cutter insert in the end of the stem, the cutter having an opening which provides communication between the exterior and interior of the stem.

A still further object of the invention is to provide a drill of the character set forth above, in which one end of the stem is slotted to receive carbide cutting and guide elements.

A still further object of the invention is to provide a drill as above set forth, with means for supplying lubricant or coolant under pressure along the exterior surface of the drill to the cutting tool of the drill, so that a cushion of coolant may be provided which surrounds the entire drill stem, to thereby stabilize it against vibration and to boost the pressure of the coolant delivered to the cutting tool, the drill cutting element being provided with an opening through which the coolant may flow into the hollow of the stem to carry away cuttings to a point of disposal.

Other objects of the invention will be apparent to those of ordinary skill in the art to which the invention pertains, from the following description and drawings.

In the drawings:

Figure 1 is a more or less diagrammatic view of a drilling appartus provided with a drill stem, arranged and constructed in accordance with an embodiment of the invention;

Fig. 1A is a continuation of the upper part of Fig. 1;

Fig. 2 is a longitudinal view, partly in section, of a drill stem embodying a form of the invention;

Fig. 3 is an end view of the drill shown in Fig. 2, illustrating the arrangement of the carbide cutting and guide elements;

Fig. 4 is a view in side elevation of the cutting tip end of the drill stem shown in Fig. 2, the view in Fig. 4 being turned 90° with respect to the view shown in Fig. 2;

Fig. 5 is a view in section, taken on line V—V on Fig. 3;

Fig. 6 is a top plan view of the end of the drill shown in Fig. 5;

Fig. 7 is a view taken on the angle indicated in Fig. 2;

Fig. 8 is a view of the end of the drill stem shown in Fig. 2, opposite the cutting tip end;

Fig. 9 is a partial view of a drill stem such as shown in Fig. 2, provided with a modified form of carbide cutting element;

Fig. 10 is an end view of the element shown in Fig. 9;

Fig. 11 is an end view of the stem of the drill; and

Fig. 12 is a view, partly in section, of a modified form of drill.

In Fig. 1 of the drawings, a work piece W is illustrated in which holes are to be drilled by means of a drilling apparatus 1. Drilling apparatus 1 includes a drill 2 disposed within a housing 3, having an annular flange or base 4 provided with seals 5 adapted to engage the work piece surface. To apply pressure to the work piece surface, the housing 3 may be provided with toggles 7 which, as shown, when actuated to a substantially straight position, urge the housing 3 firmly upon the work piece, thereby effecting a seal. The drill stem 2 is coupled to a drive shaft 8 that is slidably and rotatably disposed in a gland 9. The drive shaft 8 may be provided with a pulley 10 or other suitable means, through which the drive shaft and stem 2 may be rotated.

The drill may be fed into the work piece by a feeding device (not shown) which applies a force to a thrust bearing T. B., see Fig. 1A.

The drill stem 2 and the drive shaft 8 are hollow, so as to provide communication with the bottom of the hole 11 being drilled in the work piece W.

Coolant or lubricant is supplied under pressure to the housing 3 from a supply pipe 12. The coolant fills the space about the drill stem and flows downwardly on the outside of the stem into the hole 11, and thence through an opening in the cutting end of the drill into the interior thereof, and thence outwardly through the hollow of the stem and the drive shaft 8 to discharge. The chips or cuttings are carried by the coolant into the hollow of the stem, to discharge. Since the chips flow with the coolant on the inside of the drill stem, these cuttings or chips will not mar or score the drilled surface.

The drill stem may be constructed as shown in Figs. 2 to 8, inclusive. As illustrated in Fig. 2, the drill stem 2 is of hollow, tubular stock, and is provided on its exterior surface with a spiral impeller. The impeller may be formed by one or more spiral ribs 14. The particular stem shown in Fig. 2 is provided with four spiral ribs 14. The spiral ribs 14 are preferably formed as an integral part of the drill stem body, in dies in any suitable manner. As shown in Fig. 11, the drill stem is rotated in a clockwise direction, as indicated by the arrow R, and that the ribs 14 are so formed as to act effectively as a booster pump for the coolant which flows down the outside of the drill stem in the space between a bushing 14' and the outside of the drill stem. As illustrated, the trailing surfaces of the ribs 14 have shoulders 14a that are radial to the center of the drill stem. The leading surfaces of the ribs 14 are disposed at an angle a to a line 14c, which is tangent to a circuit at the base of the rib. The inclined face of the rib is identified by reference character 14b.

One end of the stem 2 is provided with a cutting element 15. As shown in Figs. 4 to 7, inclusive, the end of the stem is saw-cut at its diameter, to accommodate a carbide insert 16. As shown in Fig. 3, the insert extends across the tube and is received in slots at diametrically-opposite sides thereof. The cutting edge 17 of the insert falls on the diameter of the drill stem, as shown. One end of the insert 16 is enlarged, as at 18, to serve as a guide. As shown, the guide 18 is off-center, as at 19, with respect to the cutting edge. The stem is also slotted at right angles to the cutting element 16, to accommodate a carbide insert guide 20.

The carbide insert 16 may be secured in place by brazing the same to the stock of the stem at the points indicated in Figs. 3 to 6, inclusive. As shown in Fig. 5, the space between the trailing edge of the insert 16 and the guide 20 is filled by a backing member 22 of strong steel. This insert 22 closes, in effect, the portion of the end of the tube on the trailing side of the cutting edge of the insert 16.

The space in front of the cutting edge of the insert 16 is open, so that there is communication between the hole 11 being drilled, and the interior of the drill stem 2.

When the stem shown in Figs. 2 to 8, inclusive, is used in apparatus as illustrated schematically in Fig. 1, the point of the drill stem is centered over the center of the hole to be drilled. The housing 3 may then be lowered to position and clamped. When the housing has been clamped, the drill stem is rotated by the drive means at the speed required. A feed mechanism, not shown, which supplies a feeding force downwardly on the drive shaft 8, is then applied. The coolant is also supplied through pipe 12. The coolant is supplied at such a pressure that the stem 2 is cushioned by an enveloping fluid at such pressure as to hydraulically stabilize it and damp out vibrations. The ribs on the drill stem act to feed the coolant in a spiral path in the direction of feed of the drill. This feeding of the coolant by the spiral ribs 14 tends to increase or boost the supply pressure of the coolant, and to further stabilize the drill, particularly in the hole 11. By damping out vibrations of the drill in the manner indicated, the drill may be operated at higher speeds without subjecting the carbide cutting elements to the shock of vibration. Carbide cutting tools of this type are subject to breakage if exposed to excessive vibration under load.

As the coolant is advanced into the bottom of the hole 11, it flows through the open space at the front of the cutting edge of the carbide insert 16, into the hollow of the drill stem and the drive shaft 8. The coolant flowing as described, carries with it the cuttings. These cuttings and the coolant are discharged from the drive shaft to a sump or collector (not shown), in which the chips or cuttings may settle out and the coolant re-used.

Instead of constructing the cutting edges of the drill, as shown in Figs. 2 to 7, inclusive, the cutting tool of the drill may be constructed as shown in Figs. 9 and 10. As there illustrated, the end of the hollow drill stem 24 is beveled to receive a solid or one-piece carbide cutting tip insert 25. The inner portion of the tip is cone-shaped, as at 26, and the surfaces of that cone are brazed or otherwise secured to the drill stem 24. The tip or carbide cutting element 25 is provided with a cutting edge 26', as shown in Fig. 10. A portion of the cutting tip 25 extending from the center to the guide 27, is solid, as at 28. The hollow portion 28 communicates with the interior of the drill stem 24, so that when the drill is drilling into a work piece, as in Fig. 1, the coolant which is fed down over the outside of the drill stem to the drill point at the bottom of the hole 11, flows from the drill point to the opening 28 into the drill pipe, thereby carrying with it the cuttings to discharge.

The drill stem 24 is also provided with helical ribs 29, which are similar to, and serve the same function as, the ribs 14, and which are preferably integral with the stem.

In cases where small diameter holes are to be bored and a drill stem of small diameter is required, the drill stem may be formed as shown in Fig. 12. As there illustrated, the drill stem 31 is hollow and provided with a carbide cutter or tool 25', similar to the one shown in Fig. 9. The body of the stem is provided with a plurality of helical grooves 32, which extend from a point near the top of the stem to a point adjacent the tool 25'. These grooves act to force the coolant downwardly to the bottom of the hole being drilled, and to boost the pressure of the supply of coolant. By providing spiral grooves in the drill stem, as shown in Fig. 12, the drill is adapted for drilling smaller diameter holes than the drill shown in Fig. 2.

The illustrated embodiments of the invention are subject to modification without departing from the spirit or the scope of the invention.

Having thus described the invention, what is claimed as new and desired to be secured by Letters Patent is:

1. In a high speed drilling apparatus comprising a housing having a longitudinal bore and including a base to align with a piece of work in which a hole is to be drilled, a seal on the base to engage the workpiece, means to urge the housing toward the workpiece into sealing engagement therewith, a hollow drive shaft mounted in the bore of the housing for rotary and axial sliding movement, means to seal the space within the bore between the drive shaft and the housing, means to rotate the drive shaft and move it axially in the bore of the housing, a hollow drill stem detachably connected to the drive shaft, means to supply liquid coolant under pressure to the space within the bore between the drive shaft and the housing, a spiral impeller rib on the outer peripheral surface of the drill stem extending in a left-hand counterclockwise pitch and arranged to co-act with the opening in the workpiece to form a pumping unit adapted to force the coolant fluid with increased pressure and direct cuttings against the centrifugal force of the rotary drill stem inward and reversely through said drill stem and rotary shaft, and a hardened cutting element secured to the free end of the hollow drill stem, the cutting element having a cutting edge substantially on the diameter of the drill stem.

2. The invention defined in claim 1 wherein the spiral impeller rib on the outer peripheral surface of the drill stem has a leading surface disposed substantially tangentially to the drill stem and a trailing surface extending substantially radially to the drill stem.

References Cited in the file of this patent

UNITED STATES PATENTS

| | | |
|---|---|---|
| 800,894 | Baldwin | Oct. 3, 1905 |
| 1,238,537 | Lloyd | Aug. 28, 1917 |
| 1,281,420 | Reid | Oct. 15, 1918 |
| 2,182,263 | Probert | Dec. 5, 1939 |
| 2,240,795 | Morgan et al. | May 6, 1941 |